United States Patent [19]
Stafford

[11] 3,963,256
[45] June 15, 1976

[54] LUGGAGE WHEELS

[76] Inventor: Josephine C. Stafford, 3636 N. Campbell, Apt. E-13, Tucson, Ariz. 85419

[22] Filed: May 20, 1975

[21] Appl. No.: 579,217

[52] U.S. Cl. .................................. 280/35; 280/639
[51] Int. Cl.² ........................................ B62D 21/14
[58] Field of Search ................. 280/35, 36 R, 34 B, 280/47.13 R, 79.1

[56] References Cited
UNITED STATES PATENTS

| | | | |
|---|---|---|---|
| 1,173,517 | 2/1916 | Hosick | 280/35 |
| 1,561,122 | 11/1925 | Stahl | 280/35 |
| 2,629,607 | 2/1953 | Roubeck | 280/35 |
| 3,871,676 | 3/1975 | Renard | 280/35 |

FOREIGN PATENTS OR APPLICATIONS

| | | | |
|---|---|---|---|
| 1,001,405 | 2/1952 | France | 280/35 |

*Primary Examiner*—Robert R. Song
*Attorney, Agent, or Firm*—Warren F. B. Lindsley

[57] ABSTRACT

A carrier for a luggage so to eliminate the necessity of a person from carrying the luggage in his hand, particularly when the luggage is heavy; the carrier consisting of a telescopic frame that is readily placeable underneath the luggage, the frame being supported at each opposite end upon a pair of freely pivotable caster wheels for traveling upon a ground, the carrier being securable in operative use under the luggage by means of a pair of elastic straps that extend around the luggage top and the opposite end of the strap being snap locked to the frame ends; the carrier being collapsed so that when not being used it can be conveniently stored in a minimum space.

3 Claims, 4 Drawing Figures

U.S. Patent June 15, 1976 3,963,256
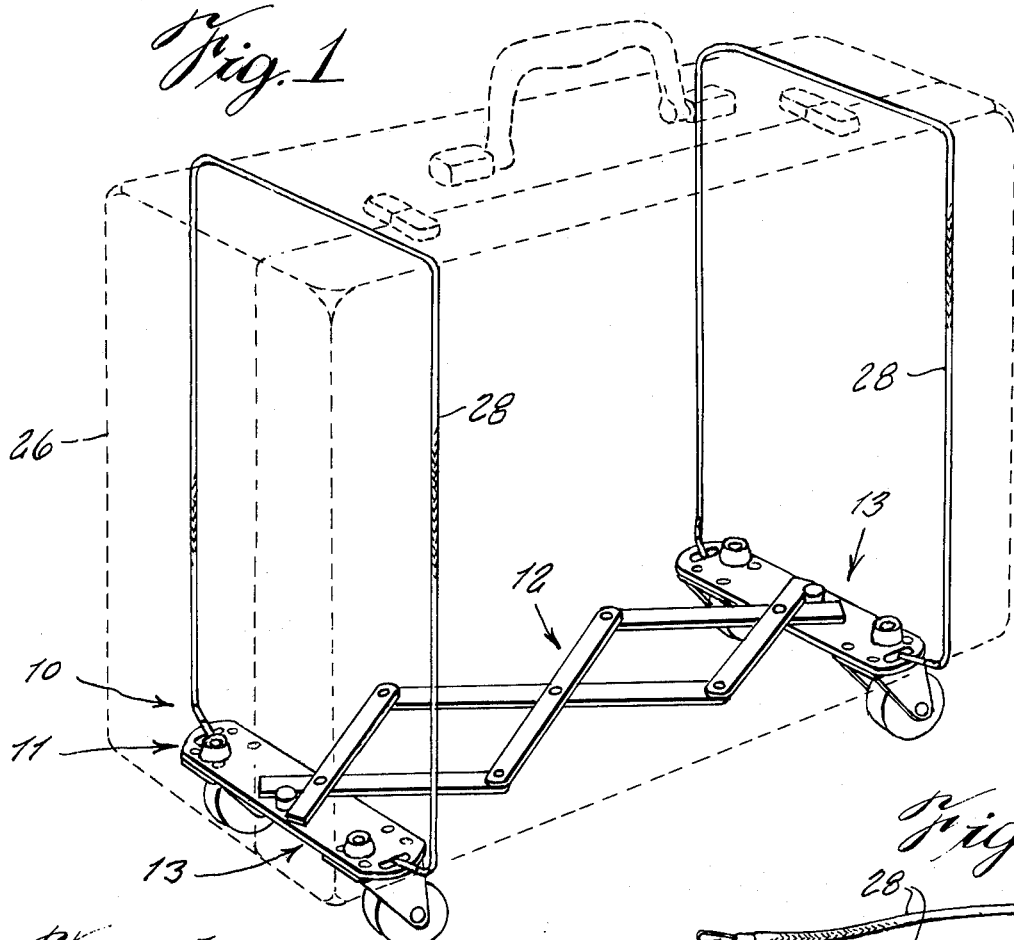
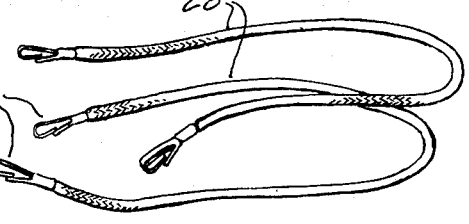
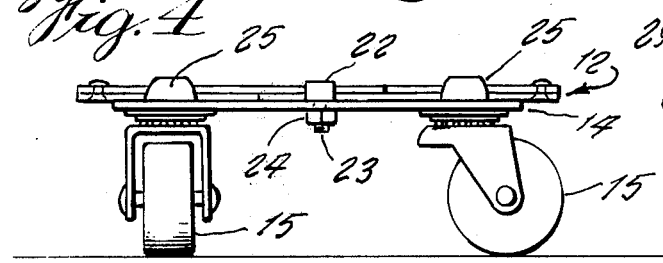
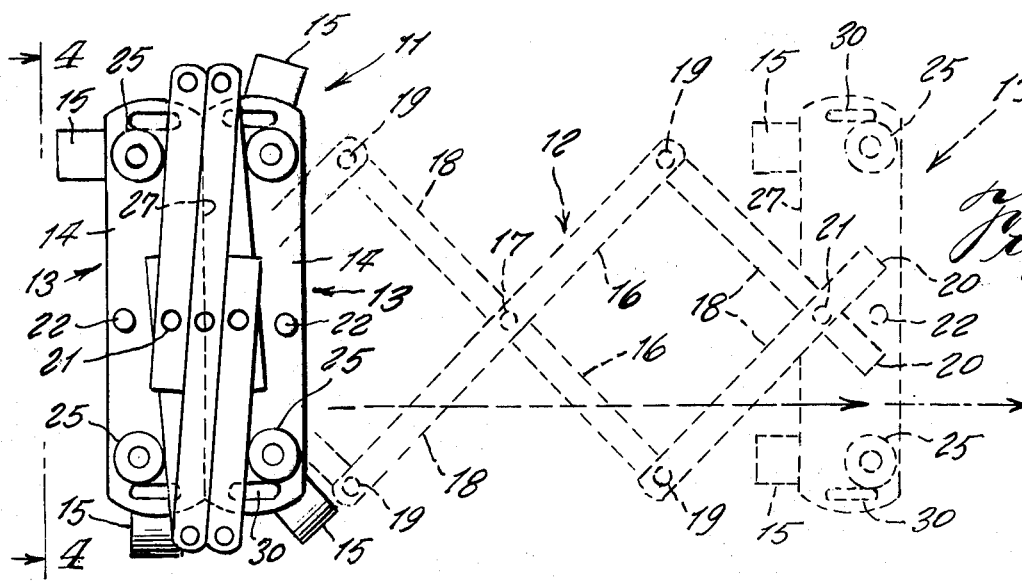

LUGGAGE WHEELS

This invention relates generally to luggage transporting devices.

It is generally well known to those persons who at times travel with a heavy luggage, and are obliged to carry the same without the benefits of a porter or other assistance, that they quickly become tired so that the luggage cannot be carried far without frequent stops in order to rest. This situation is of course objectionable and is therefore in want of an improvement.

Accordingly it is a principal object of the present invention to provide a handy carrier designed for luggage being fitted thereupon, the carriage having wheels so to travel upon a ground, thus eliminating the need of the person to carry the luggage in his hand.

Another object of the present invention is to provide a handy carrier which accordingly requires only the effort of a person to pull or push the same, which is far less tiring than carrying.

Yet another object is to provide a handy carrier which is telescopic in order to adjust itself to any size of luggage whether it be large or small.

Still another object is to provide a handy carrier which semilocks automatically when in a maximum extended position so that it is rigid against further spreading open and also having little tendency to fold up while in use.

Still a further object is to provide a handy carrier which readily collapses into a small size when not needed so that it can be stored away in a minimum space, and which during a travel will accordingly easily be able to be tucked in a corner inside the luggage so to be always available nearby whenever needed for use.

Other objects are to provide a handy carrier which is simple in design, inexpensive to manufacture, rugged space, and which during a travel will accordingly easily be able to be tucked in a corner inside the luggage so to be always available nearby whenever needed for use.

Other objects are to provide a handy carrier which is simple in design, inexpensive to manufacture, rugged in construction, easy to use and efficient in operation. dr These and other objects will be readily evident upon a study of the following specification and the accompanying drawing wherein:

FIG. 1 is a perspective view of the present invention shown in an extended position and secured underneath a luggage.

FIG. 2 is a perspective view of the strap members that are illustrated in FIG. 1, and being now shown in a relaxed, non use position.

FIG. 3 is a top view of the device shown by solid lines in a fully collapsed position, and shown by dotted lines in a fully extended position.

FIG. 4 is an end view as viewed on line 4—4 of FIG. 3.

Referring now to the drawing in detail, the reference numeral 10 represents a "luggage wheels" carrier according to the present invention wherein there is a metal frame 11 consisting of lazy tongs 12 which at each opposite end is mounted upon a swiveling truck 13 comprised of a flat plate 14 having a caster wheel 15 secured under each end thereof.

The lazy tong 12 consists of crossing central, long bars 16 pivotally attached together by a central rivet 17, and a pair of shorter bars 18 secured at their one ends to each opposite end of the long bars 16 by means of rivets 19. The shorter bars 18 cross each other relatively near their outward ends 20 and are pivotally attached together where they cross by means of a single rivet 21 which also extends through a longitudinal center part of the plate. The outward ends 20 of the bars 18 extend sufficiently in order to clasp around opposite sides of a short post 22 mounted upon an upper side of the plate, the post thus serving as a stop that limits the extending of the lazy tongs. The post is retained upon the plate by a threaded shank 23 thereof extending downwardly through the plate and being fitted with a nut 24 there beneath.

The truck plate additionally is provided with rubber bumpers 25 mounted upon its upper side, the bumpers being located near each opposite end of the plate and being slightly taller than a remainder of the carrier structure so that the corners of a luggage 26 can be supported thereupon and prevented from wobbling. The bumpers are also positioned so to abut with the lazy tongs when in a fully collapsed position so to absorb some of the collapsing movement shock and also prevent the trucks from freely pivoting about the rivet 21, thus insuring that the device is maintained at a minimum size when collapsed.

As shown in FIG. 3, it is to be noted that in a fully collapsed condition, that the side edges 27 of the two plates also abut with each other so that the device takes up minimum space in storage. Thus the device can also be packaged within a minimum size box when being retailed to a customer.

The carrier is securable to the underside of the luggage by means of a pair of elastic straps 28 so to hold around any size of luggage, the opposite ends of each strap being fitted with a snap hook 29 that is removably attachable to a slotted opening 30 formed through each of the plates.

It will now be apparent that the carrier can be quickly and easily attached and detached from a luggage and that it will allow transportation of the luggage without excessive effort. It is also to be noted that by securing the carrier to the luggage, the luggage can be momentarily lifted by hand when climbing a street curb upon a side walk, and the carrier is lifted thus together therewith, thus not requiring any separate attention.

Thus there is provided a useful "luggage wheels" carrier.

While various changes may be made in the detailed construction, it is understood that such changes will be within the spirit and scope of the present invention as is defined by appended claims.

What I claim:

1. In a luggage carrier, the combination of a metal frame comprised of an extendable lazy tongs secured pivotally at each opposite end to a swiveling truck consisting of a flat plate having a caster wheel secured under end thereof, and means whereby said frame is securable to an underside of luggage, said lazy tongs comprising a plurality of crossing bars having a pair of long central bars pivotally attached together at their centers, and a pair of shorter bars secured pivotally at each opposite end of said longer bars, said shorter bars crossing each other near their outward ends and being freely pivotable about a rivet extending through said plate, said outward ends of said short bars being positioned to clasp a post mounted upon said plate.

2. The combination as set forth in claim 1 wherein a pair of rubber bumpers are mounted upon an upper side of each of said plates, said rubber bumpers being positioned near opposite ends of said plates, said rubber bumpers being relatively taller than a remainder of said carrier for said luggage to rest thereupon.

3. The combination as set forth in claim 2 wherein said means comprises a pair of elastic straps having snap hooks at their opposite ends, and said plates having slotted openings at their ends for engaging said snap hooks.

* * * * *